Patented Oct. 9, 1951

2,570,917

UNITED STATES PATENT OFFICE 2,570,917

METHOD OF FUMIGATION WITH 1,1-DI-FLUOROETHYLFLUOSULFONATES

John Douglas Calfee, Manhasset, N. Y., assignor to Allied Chemical & Dye Corporation, New York, N. Y., a corporation of New York No Drawing. Application August 3, 1949, Serial No. 108,411

7 Claims. (Cl. 167—22)

This invention relates to a method of fumigation and more particularly to a process for combatting pest organisms by contacting them with the vapors of a 1,1-difluoroethylfluosulfonate compound.

Many pest organisms infest hosts such as grain, textiles, dwellings, warehouses and the like, in such a manner that they penetrate deeply into the interior of the host space and are difficult if not impossible to reach through the application of surface poisons or pesticides. In such cases it has been the custom in the past to attempt to control such pests by fumigation, i. e. by passing gaseous toxicants through the infested material or spaces. Such toxicants must not only be effective in controlling the pest, but should be relatively non-injurious to the host materials and should be of such volatility that they are readily expelled from the host space after their application.

The common fumigants most used in the past, for example hydrogen cyanide, chloropicrin (trichloronitromethane) carbon tetrachloride, other chlorinated hydrocarbons, etc. are for the most part highly toxic or irritating to humans, it being common knowledge that hydrogen cyanide, previously widely used for fumigation, is one of the most lethal of all gases, and that chloropicrin, also extensively used, is not only a highly irritating and nausea-producing lachrymator, but also that it adversely affects the germination of grain and is deleterious to the baking quality of flour. Furthermore, chlorinated hydrocarbons in general tend to have a high toxicity toward humans, and other undesirable characteristics.

I have now found that the two compounds 1,1-difluoroethylfluosulfonate and 1,1 - difluoro - 2-chloroethylfluosulfonate are surprisingly effective fumigants not only in exerting extremely lethal effects against the common penetrating pests such as those infesting grain, flour, carpets, etc., but that they are relatively less toxic or irritating to humans than certain of the fumigants heretofore widely used and they possess the desired high volatility which renders them excellent penetrants and permits of their ready expulsion or release from the fumigated spaces after their application. They are non-explosive and non-inflammable under normal conditions of use as fumigants.

The method of fumigation to which the present invention is directed comprises contacting the pests in the enclosure in which the pests exist, with either one or both of the two 1,1-difluoro-ethylfluosulfonate compounds having the following general formula:

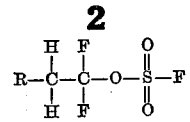

wherein R is a member selected from the group consisting of a hydrogen atom and a chlorine atom.

My new method is particularly applicable to combatting infestations in flour and grain in storage bins, grain elevators and the like and in combatting textile pests such as the black carpet beetle in storage warehouses, in homes or other enclosed spaces, and is also effective in controlling other pests such as roaches, bedbugs, flies, etc.

Fumingation is carried out with the 1,1-difluoroethylfluosulfonate compounds according to well established methods generally similar to those employed in the application of chloropicrin, since the new compounds, when in the vapor state, are, like chloropicrin, heavier than air. For example, the enclosed space to be fumigated is tightly sealed and then the liquid 1,1-difluoroethylfluosulfonate is placed in the enclosure in such a manner that it is free to volatilize and permeate the space. This may be done, for example, by placing the liquid in open canisters or shallow trays in the enclosed space at normal room temperatures (about 25° C.) or slightly elevated temperatures and allowing it to vaporize. In treating grain or flour, the liquid may simply be poured or sprayed over the grain or flour material as it is stacked in the enclosed space, such as storage warehouses or in bins, elevators, etc., and allowed to vaporize and to remain in the enclosed space until it has substantially completely volatilized or permeated the space. Since the vapor is heavier than air, it tends to sink to the bottom of the stack or bin and penetrate the grain as it settles, killing the pest organisms. In general, a dosage of about 2 pounds of the 1,1-difluoroethylfluosulfonate per 1000 cubic feet of enclosed space is sufficient to saturate the space and to insure effective control of the pests.

The effectiveness of the new fumigants for use according to my invention is illustrated by the tests described below.

Fumigation tests were run against three important common pests, the confused flour beetle, the lesser grain borer, and larvae of the black carpet beetle, using the two compounds of my invention in direct comparison with two standard prior art fumigants, carbon tetrachloride and chloropicrin, all against a control test in which no fumigant at all was used. All tests were run under substantially identical conditions.

In carrying out these tests, pill boxes containing insects were placed on the bottom of two-quart glass jars and the jars then filled with wheat. The fumigant was pipetted onto absorbent cellulose in the neck of each jar and the jars sealed immediately. The jars were kept sealed for 2 hours, then opened and allowed to exhaust for 16 hours under a chemical hood. The pill boxes were removed and counts made after 2 days.

The experiment described above was repeated excepting that the insects were confined in pill boxes at the center of two-quart glass jars filled with grain. Results obtained in both experiments are presented in the table below:

Table—Fumigation tests

| Fumigant | Amount | Position of Insects | Per Cent Kill Against— | | |
|---|---|---|---|---|---|
| | | | Confused Flour Beetle | Lesser Grain Borer | Black Carpet Beetle Larvae |
| | Cc. | | | | |
| $CH_3CF_2SO_3F$ | 0.1 | center | 100 | 100 | 100 |
| | | bottom | 100 | 100 | 90 |
| | 0.05 | center | 100 | 100 | 90 |
| | | bottom | 50 | 100 | 90 |
| $CH_2ClCF_2SO_3F$ | 0.1 | center | 100 | 100 | 40 |
| | | bottom | 100 | 100 | 100 |
| | 0.05 | center | 100 | 100 | 60 |
| | | bottom | 100 | 100 | 60 |
| Carbon Tetrachloride | 0.01 | center | 0 | 0 | 0 |
| | 0.05 | do | 0 | 0 | 0 |
| Chloropicrin | 0.01 | bottom | 100 | 100 | 100 |
| | 0.05 | do | 100 | 100 | 60 |
| Control | 0.00 | bottom | 0 | 0 | 0 |

The 1,1-difluoroethylfluosulfonates may be prepared from fluosulfonic acid and 1,1-difluoroethene and 1,1-difluoro-2-chloroethene, respectively, as disclosed and claimed in my copending application with another, Serial No. 108,412, filed as of even date herewith, for example, by passing the gaseous 1,1-difluoroethene compound into the liquid fluosulfonic acid at temperatures not above about 50° C., either at atmospheric pressure or under superatmospheric pressure. The pure compounds may be obtained by fractional distillation of the crude reaction product. The 1,1-difluoroethylfluosulfonate boils between 74° C. and 75° C., has a vapor pressure of 137 mm. Hg at 25° C., a vapor density of 7.32 grams per liter, and a molecular weight of 164. The 1,1-difluoro-2-chloroethylfluosulfonate boils between 107° C. and 109° C., has a vapor pressure of 41 mm. Hg at 25° C., a vapor density of 8.82 grams per liter, and a molecular weight of 198.5.

While the above describes the preferred embodiments of my invention, it will be understood that departures may be made therefrom within the scope of the specification and claims.

I claim:

1. In a process for combatting pest organisms by fumigation, the step which comprises contacting such organisms with the vapor of a 1,1-difluoroethylfluosulfonate having the general formula:

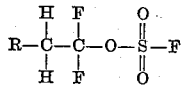

wherein R is a member selected from the group consisting of a hydrogen atom and a chlorine atom.

2. In a process for combatting pest organisms by fumigation, the step which comprises contacting such organisms with the vapor of a 1,1-difluoroethylfluosulfonate having the general formula:

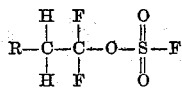

wherein R is a member selected from the group consisting of a hydrogen atom and a chlorine atom in a concentration of about 2 pounds of 1,1-difluoroethylfluosulfonate compound per 1000 cubic feet of enclosed space.

3. In a process for controlling pest organisms in stored grain in enclosed spaces, the steps which comprise placing on the top of the grain a quantity of a liquid 1,1-difluoroethylfluosulfonate having the formula:

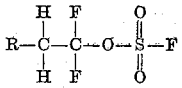

wherein R is a member selected from the group consisting of a hydrogen atom and a chlorine atom, at a temperature of at least about 25° C., and maintaining the grain-containing space in closed condition until the liquid 1,1-difluoroethylfluosulfonate has substantially completely vaporized and permeated the enclosed space.

4. In a process for combatting pest organisms by fumigation, the step which comprises contacting such organism with vapors of 1,1-difluoroethylfluosulfonate.

5. In a process for combatting pest organisms by fumigation, the step which comprises contacting such organism with vapors of 1,1-difluoro-2-chloroethylfluosulfonate.

6. The process of claim 3 wherein R is a hydrogen atom.

7. The process of claim 3 wherein R is a chlorine atom.

JOHN DOUGLAS CALFEE.

REFERENCES CITED

The following references are of record in the file of this patent:

UNITED STATES PATENTS

| Number | Name | Date |
|---|---|---|
| 1,448,276 | Landau | Mar. 13, 1923 |

OTHER REFERENCES

Martin et al.: BIOS Final Report No. 1095, Item No. 22, entitled "Developments in Methods and Materials for the Control of Plant Pests and Diseases in Germany," printed March 24, 1947, pp. 32, 34, 51, 59, 60.